(12) United States Patent
Kruglick

(10) Patent No.: US 8,395,591 B2
(45) Date of Patent: Mar. 12, 2013

(54) ELECTRO-OSMOTIC TACTILE DISPLAY

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 871 days.

(21) Appl. No.: 12/507,683

(22) Filed: Jul. 22, 2009

(65) Prior Publication Data
US 2011/0018813 A1  Jan. 27, 2011

(51) Int. Cl.
*G06F 3/041* (2006.01)

(52) U.S. Cl. .......... 345/173; 345/156; 345/174; 341/21; 341/27; 341/33; 341/34; 178/18.03

(58) Field of Classification Search .................. 345/173, 345/174, 156; 341/20–22, 27, 33–34; 178/18.01, 178/18.03–18.07
See application file for complete search history.

(56) References Cited

U.S. PATENT DOCUMENTS

| | | | |
|---|---|---|---|
| 7,382,357 B2* | 6/2008 | Panotopoulos et al. | 345/168 |
| 2008/0209876 A1* | 9/2008 | Miller | 55/522 |
| 2009/0002205 A1* | 1/2009 | Klinghult et al. | 341/33 |
| 2009/0002328 A1* | 1/2009 | Ullrich et al. | 345/173 |
| 2009/0015560 A1* | 1/2009 | Robinson et al. | 345/168 |
| 2009/0066672 A1* | 3/2009 | Tanabe et al. | 345/176 |
| 2009/0128503 A1* | 5/2009 | Grant et al. | 345/173 |
| 2009/0174673 A1* | 7/2009 | Ciesla | 345/173 |
| 2009/0174687 A1* | 7/2009 | Ciesla et al. | 345/174 |
| 2009/0250267 A1* | 10/2009 | Heubel et al. | 178/18.03 |
| 2010/0103137 A1* | 4/2010 | Ciesla et al. | 345/174 |
| 2010/0141407 A1* | 6/2010 | Heubel et al. | 340/407.1 |
| 2010/0177050 A1* | 7/2010 | Heubel et al. | 345/173 |

OTHER PUBLICATIONS

Wikipedia, printed on Dec. 30, 2011, http://en.wikipedia.org/wiki/Electroosmotic_flow.
Stroock et al., "Patterning Electro-osmotic flow with Patterned Surface Charge", Physical Review Letters, vol. 84 No. 15, Apr. 2000.
J. Smith et al., "Capillary Zone Electrophoresis of Biological Substances with Surface-Modified Fused Silica Capillaries with Switchable Electroosmotic Flow", Journal of High Resolution Chromoatography, vol. 15, Sep. 1992, p. 573.

* cited by examiner

*Primary Examiner* — Lun-Yi Lao
*Assistant Examiner* — Priyank Shah
(74) *Attorney, Agent, or Firm* — Dorsey & Whitney LLP

(57) ABSTRACT

The present disclosure generally relates to tactile display devices that include a reservoir for containing a driving fluid. A plurality of toxel portions may be sensitively drivable by the fluid for causing toxels to be displayed, and a pump member associated with the reservoir and toxel portions may pump the fluid from the reservoir to selected toxel portions to display a tactile image. The pump member may include an electro-osmotic pump configured to pump the fluid electro-osmotically in response to an applied voltage, and may be configured to selectively pump the fluid to generally activate the toxels independently from each other. The toxel layer may include the plurality of toxels as well as an elastomeric membrane that may have a pattern of the toxels, and may be configured such that the toxels may be expandable generally independently of each other in response to increased pressure of the fluid pumped into association therewith.

19 Claims, 6 Drawing Sheets

ELECTRO-OSMOTIC TACTILE DISPLAY

BACKGROUND

Information may be communicated to recipients through electronic means, such as a computer, mobile device, and/or simulator, for example. Electronic information, as well as virtually any information communicated from a distance, has traditionally been provided to recipients through audio and visual channels.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

In the drawings.

DETAILED DESCRIPTION

Figure 1:
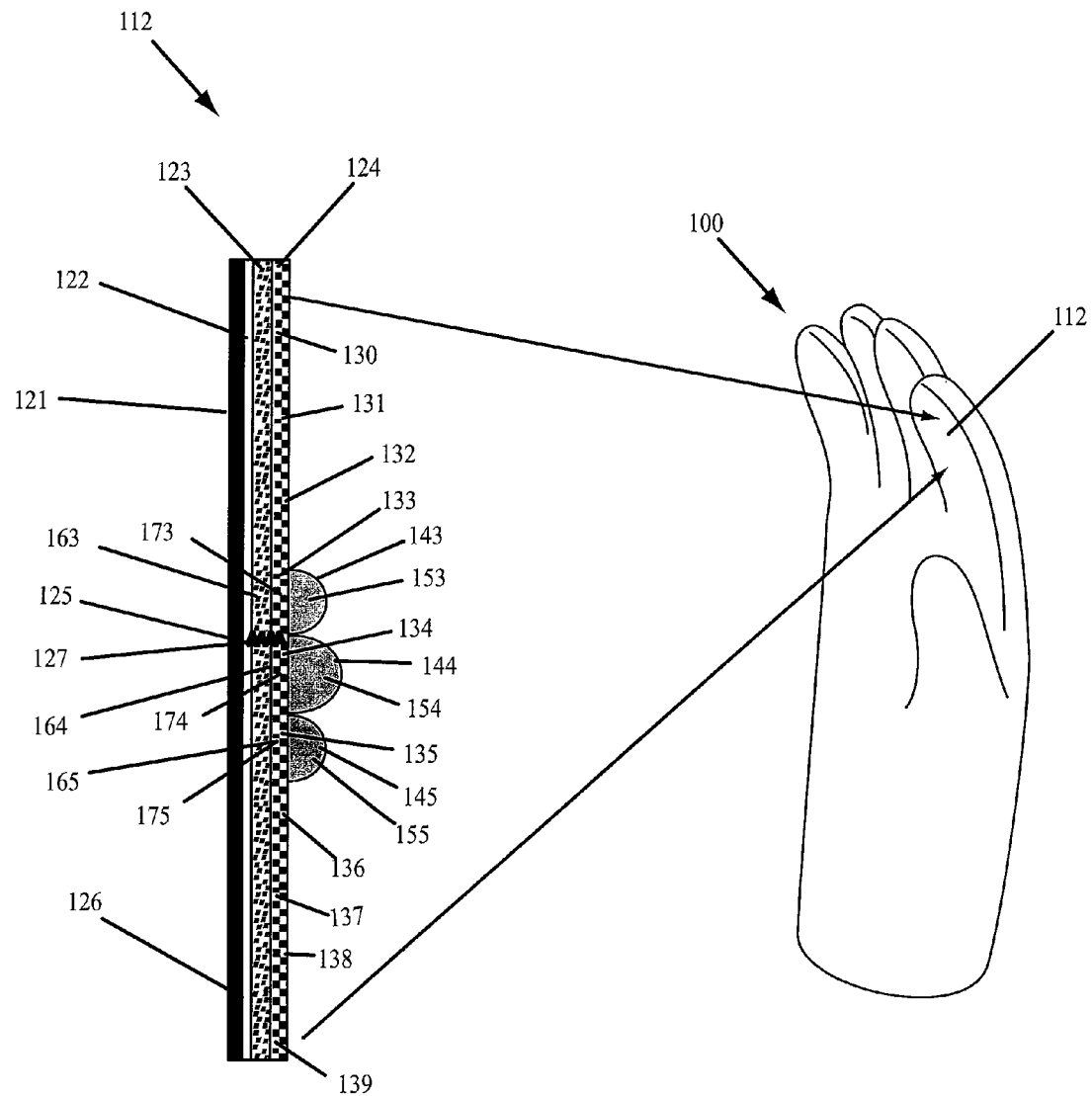
FIG. 1 depicts a tactile display device.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is generally drawn to devices, apparatuses, methods, and systems related to tactile display. Adding data channels other than visual and audio channels to communicate data through interfaces is generally desirable. Users of interfaces, as well as designers, manufacturers, and suppliers of interfaces may benefit from the addition of other data channels. Touch data, for instance, may provide heightened data to a user in terms of the type and quantity of information that may be communicated to a user of a suitable device or apparatus. In some examples, tactile display devices may be arranged to effectively communicate touch data in a selective, targeted and/or rapid manner so as to meaningfully and usefully stimulate a person's sense of touch. In some examples, the tactile displays may be scalable and cost effective so as to properly address existing and anticipated applications with which they may be used. Example uses may include, but are not limited to, 3-dimensional world and immersion situations, training simulators, medical rehabilitation, and educational applications.

Examples in accordance with the present disclosure may provide a touch sense display to a person's skin using, for example, a glove, article of clothing and/or device having a body-touching layer. Such example devices may be worn or otherwise disposed such that the body-touching layer may contact a person's skin. Some examples may not come in direct contact with a person's skin, but rather may be disposed for indirect contact, for example, via contact with clothing that the user may be wearing.

FIG. 1 depicts a tactile display device arranged in accordance with at least some implementations of the present disclosure. The tactile display device 100 may include a zone 112, an enlarged view of which is depicted in FIG. 1. In this example, the tactile display device is configured as a wearable glove, though other examples may include displays such as full body suits, upper body suits, lower body suits, head covers, and the like, or any combination thereof. The tactile display device 100 may include outer surface layer 121, reservoir layer 122, pump member 123, and toxel layer 124. The outer surface layer 121 may include a receiver (not shown). The toxel layer 124 may include toxels 130, 131, 133, 134, 135, 136, 137, 138, 139. Bubbles 143, 144, 145 and corresponding bubble cavities 153, 154, 155 may be formed by the toxels 133, 134, 135 during use of the tactile display device 100. The tactile display device 100 may include channels 163, 164, 165 through which a liquid 126 may flow between the reservoir layer 122 and the toxel layer 124.

The tactile display device 100 may be configured for electro-osmotic flow (EOF), which may be described as the motion of a liquid through narrow channels under a low applied electric field. Electro-osmotic flow may occur in natural unfiltered water, as well as in buffered solutions. Liquid 126 may be disposed in reservoir layer 122, which may be configured so that the liquid 126 may be pumped by the pump member 123 by electro-osmosis when a low electric field is applied across the pump member 123. The liquid 126 thus may be pumped by the pump member 123 to flow through the channels 163, 164, 165 from the reservoir layer 122 to the toxel layer 124 and form bubbles 143, 144, 145 and corresponding bubble cavities 153, 154, 155. The liquid 126 being pumped to the toxel layer may cause bubbles 143, 144, 145 to form, expand, and protrude so as to make physical contact with a user of the tactile display device 100 and thereby communicate tactile information. Bubbles 143, 144, 145 may be constructed of an elastic material so that when the low electric field is no longer applied across the pump member 123, the liquid 126 may be forced by the elasticity of the material from which the bubbles 143, 144, 145 may be arranged, to flow through the channels 163, 164, 165 from the toxel layer 124 back to the reservoir layer 122. This action may cause the bubbles 143, 144, 145 to deflate so as to no longer protrude and make physical contact, or cause physical contact to be made, with a user of the tactile display device 100.

As depicted in FIG. 1, layers 121, 122, 123, 124 may be a series of layers, each of which may comprise a member. In various examples, more or fewer layers than shown in FIG. 1 may be provided. The outer surface layer 121 may be the outer-most layer, or the furthest away from the user's skin. The next inward layer toward the skin may be the reservoir layer 122, and the next inward layer may be the pump member 123. The next inward layer towards the user's skin, and in some examples the final layer (the layer closest to the user's skin), may be the toxel layer 124.

The outer surface layer 121 may comprise a material such as rubber or latex. In some examples, conductivity enhancers may be provided on the outer surface layer 121, such as, for example, lithium salts, or silicone nitride particles alone or in combination with silicone carbide whisker, or other suitable materials. The material included in the construction of the outer surface layer 121 may be selected and configured so that the outer surface layer 121 may be sealed to protect the interior components from exposure to, e.g., liquids, moisture, dirt, and dust, which may potentially cause damage to the tactile display device 100. The outer surface layer 121 may be grounded and configured to absorb a current so that a resistance may be tolerated by the tactile display device 100 where such resistance may not interfere with the operation of the tactile display device 100.

In some examples, the outer surface layer 121 may include wires 127 or other electrical conductors, fiber-optic cables, nano-tubes or other types of conduits or channels 163, 164, 165 that may be configured to carry signals 125. The wires 127 may be configured to carry signals 125 from a receiver (not shown) to facilitate selectively forming the bubbles 143, 144, 145 that may communicate touch data to a user of the tactile display device 100. The wires 127 may be bundled, grouped, individually disposed or otherwise configured.

The outer surface layer 121 may include various types of patterning, in some examples. Patterning may be based on, for example, construction of the tactile display device 100, mobility of the user of the display device 100, and/or decorative preferences. In some examples, patterning may be used to provide for the wires 127 to connect to the actuators (not shown in FIG. 1, see 173 and 175 of FIG. 2). Patterning may be configured to correspond to patterning that may be included in the other layers 122, 123, 124, including patterning of the toxels 130, 131, 132, 133, 134, 135, 136, 137, 138, 139.

The reservoir layer 122 may comprise or may include a porous cloth and/or a reservoir that may be created by texturing the side of the outer surface layer 121 that is closest to the user's skin. The reservoir layer 122 may be configured to contain the liquid 126. Various types and configurations of porous cloth may be used in the construction of the reservoir layer 122 so that liquid 126 may be contained therein. The reservoir layer 122 and the material used in its contraction may be selected based upon, for example, its absorption capacity, and chemical and mechanical properties. In some implementations, the reservoir layer 122 or material from which it is constructed may be selected so that the reservoir layer 122 does not chemically react with liquid 126 or any other element of the tactile display device 100 that may potentially come into contact with the material from which the porous cloth may be constructed. The reservoir layer 122 may be configured to allow the liquid 126 to flow from the reservoir layer 122 to activate some or all of the toxels in the toxel layer and thereby communicate touch data to the user of the tactile display device 100. The liquid 126 may contain ions in a solvent including silanol groups, and the channels may be made of silica ($SiO_2$), for example.

In the example depicted in FIG. 1, the pump member 123 may comprise a silica mat layer configured for pumping the fluid 126 electro-osmotically in response to a signal. An electric field may be applied across pump member 123 to cause the fluid to be pumped in an electro-osmotic fashion into bubble cavities 153, 154, 155. Flow of the fluid into the bubble cavities 153, 154, 155, which may be constructed of an elastic material, causes bubbles 153, 154, 155 to form and the bubble cavities 153, 154, 155 to expand. Some examples may be configured so that when an electric field is no longer applied across the pump member 123 (e.g., the potential difference is set to zero), the elastic force of the material from which the bubbles 143, 144, 145 are constructed forces the fluid 126 from the bubble cavities 153, 154, 155 back to the reservoir layer 122. Accordingly, the bubbles 143, 144, 145 deflate, thereby ceasing the communication of touch data to the user.

Toxel layer 124 may be the next layer towards the skin. In some examples, toxel later 124 may be the final inner-most layer and may be in contact with a user's skin. In some examples, toxel layer 124 may be patterned, for example with ribs, stripes, circular patterns, repeating patterns, random patterns, patterns that increase or decrease in size according to placement, or any other pattern or combination of patterns. Toxel layer 124 patterns may be based on the configurations of the pump member 123, and/or the applications with which the tactile display device 100 may be used, or other considerations. Toxel layer 124 may be arranged so as to provide electrodes on the back of the pump member 123. A voltage adjustment may be used to alter the potential of the pump member, such that when a negative voltage is applied across the pump member 123, a dual layer structure forms as silanol layers to provide for a surface layer to the silica, and cations stream down the space within the silanol layer carrying the solvent with them. Examples using this pump mechanism may be configured to provide flow rates in the range of multiple millimeters per second and/or on scales of about 200 μm per second, for example.

Figure 2:
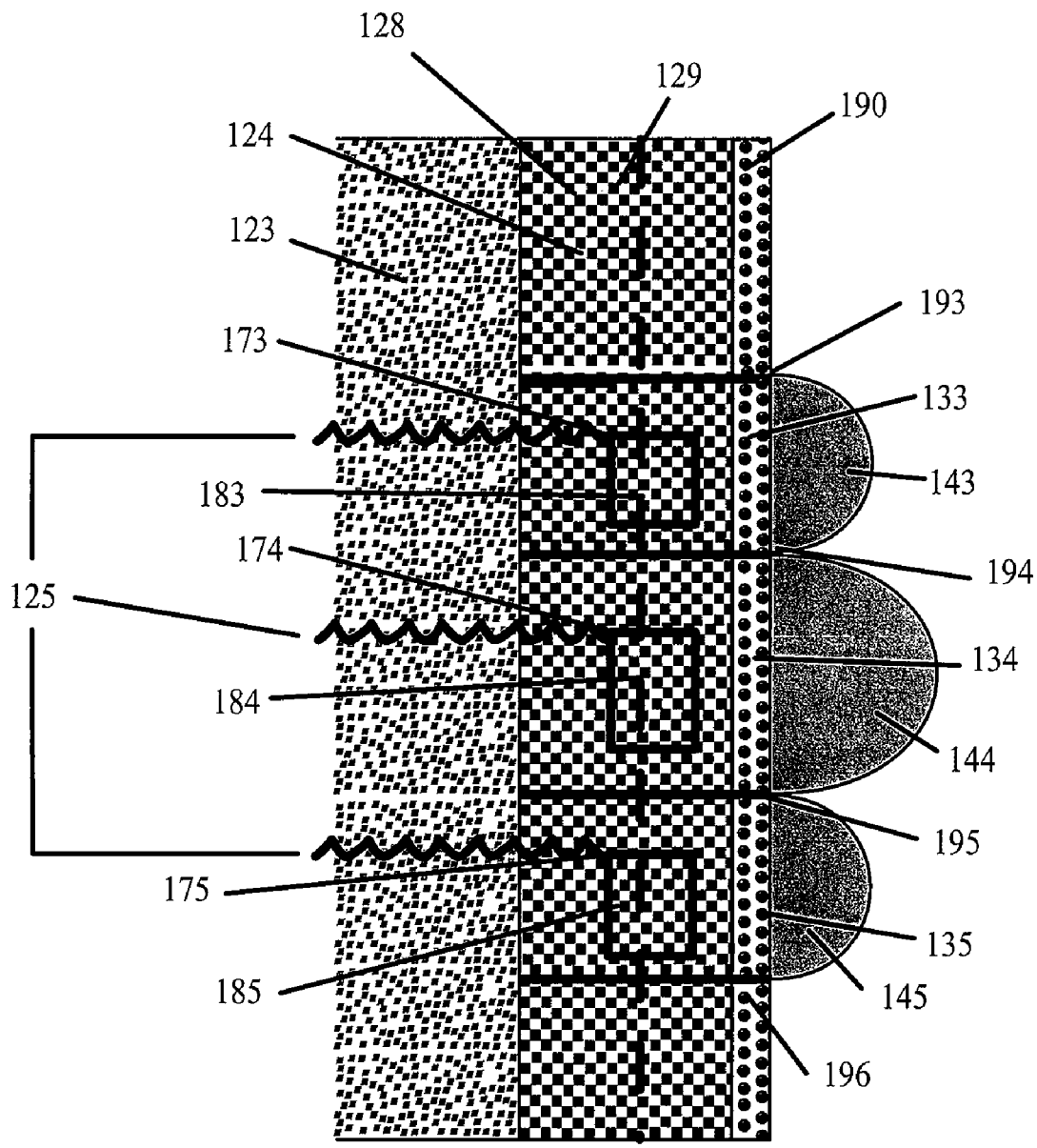
FIG. 2 depicts an enlarged view of the tactile display device of FIG. 1.

FIG. 2 depicts an enlarged view of the tactile display device of FIG. 1, also arranged in accordance with the present disclosure. As depicted, an actuation layer 128 may be included and may comprise a plurality of actuators 173, 174, 175, which may be comprised in a pattern of electrodes. Electrode patterns may be dictated by the type of device used, for example, a glove device may have closely spaced electrodes to permit for a greater number of toxels to be activated in the hands, which are relatively sensitive, whereas a device that is worn on the legs may have more spread out electrodes. The pattern of electrodes may also be dictated or influenced by the intended application for the tactile display. For instance, if the tactile device is used with a computer baseball game, a circular, densely packed configuration of electrodes may be used on an arm portion of a shirt-like tactile display, in order to simulate the vibrations that course down a batters arm, as she hits the baseball. The tactile display device 100 may comprise a plurality of toxel portions 183, 184, 185 sensitively drivable by the fluid 126 for causing the toxels 133, 134, 135 to be displayed. The actuators 173, 174, 175 may be patterned on an elastomer at the actuation layer 128, such that the toxels 133, 134, 135 may form bubbles 143, 144, 145 using the pump member 123. Accordingly, an electrode layer 129 may be formed on the actuation layer 128. In some examples, the electrode layer 129 may be permeable so as to increase the amplitude of bubbles 143, 144, 145, which may otherwise be inherently limited in size due to a decreasing field strength as bubbles 143, 144, 145 expand.

In some other examples, the actuators 173, 174, 175 may be patterned and disposed on a perforated layer or directly on the back of the pump member 123. The pattern formed by actuators may be based on the configuration and/or type of tactile display used, and/or the application used with the tactile display, or any other consideration, such as cost and/or system efficiency. An inner elastomeric layer 190, which may comprise an elastomeric membrane in some examples, may be formed to associate the electrode layer 129 with the actuation layer 128 and expand bubbles 143, 144, 145 so as to press against a users' skin in response to the signal 125.

In some examples, the selection of the flow solvent may result in bidirectional electro-osmotic flow such that the liquid 126 is directed back into the reservoir layer 122 at an accelerated speed to provide faster response than in examples that use the elastic force from the extended bubble cavities to push the liquid back through the pump member 123. The flow rate of the liquid 126 and the amplitude of the bubbles 143, 144, 145 may be considered when selecting the rigidity of the elastomer layer, for example. Dual-directional pumping may be employed to increase the size of bubbles 143, 144, 145 when a soft elastomer is used to comprise the toxel layer. Using dual-directional pumping may allow for a relatively fast bubble expansion or deflation, as compared to when dual-directional pumping is not used. Increasing the speed at which the bubbles may expand and/or deflate may permit the user to experience a relatively rapid sensation change, compared to when the elastic force from the extended bubble cavities is used to push the liquid back through the pump member 123, for example.

In other examples, the layers of the tactile display device 100 may be configured so that the pump member 123 may be disposed farther away from the skin relative to the reservoir layer 122. Wires 127 may be grouped and/or bundled in some examples based on considerations of spatial configurations and/or the signal(s) that may be sent to one or more toxels, for example. Other examples may use wireless communication (not shown) in place of or in addition to wires to communicate signal(s) to toxels for expanding bubbles 143, 144, 145. Wireless communication (not shown) may be employed using any suitable wireless protocol, such as acoustic, radio frequency (RF), infrared (IR), or any other wireless media. In some examples, the layers may be configured so as to be disposed in a varying order with respect to one another and to the skin of the user of the tactile. For example, in contrast to the examples shown in FIGS. 1 and 2, the actuation layer may be disposed on a side of the reservoir further away from the user's skin.

In some examples, the tactile display device may be configured to receive the signals wirelessly. The wireless signals may be received from a communication controller, which may be disposed in a computing device or in the tactile display device, that is configured to send the signals wirelessly to the actuators, as well as to all actuators that may be included in the tactile display device 100 from FIG. 1, which may be configured to receive the signals wirelessly (not shown). In some examples, the tactile display device may comprise a receiver that is configured to receive signals wirelessly from a tactile display controller disposed in a computing device, and to send the signals wirelessly to the actuators.

Figure 3:
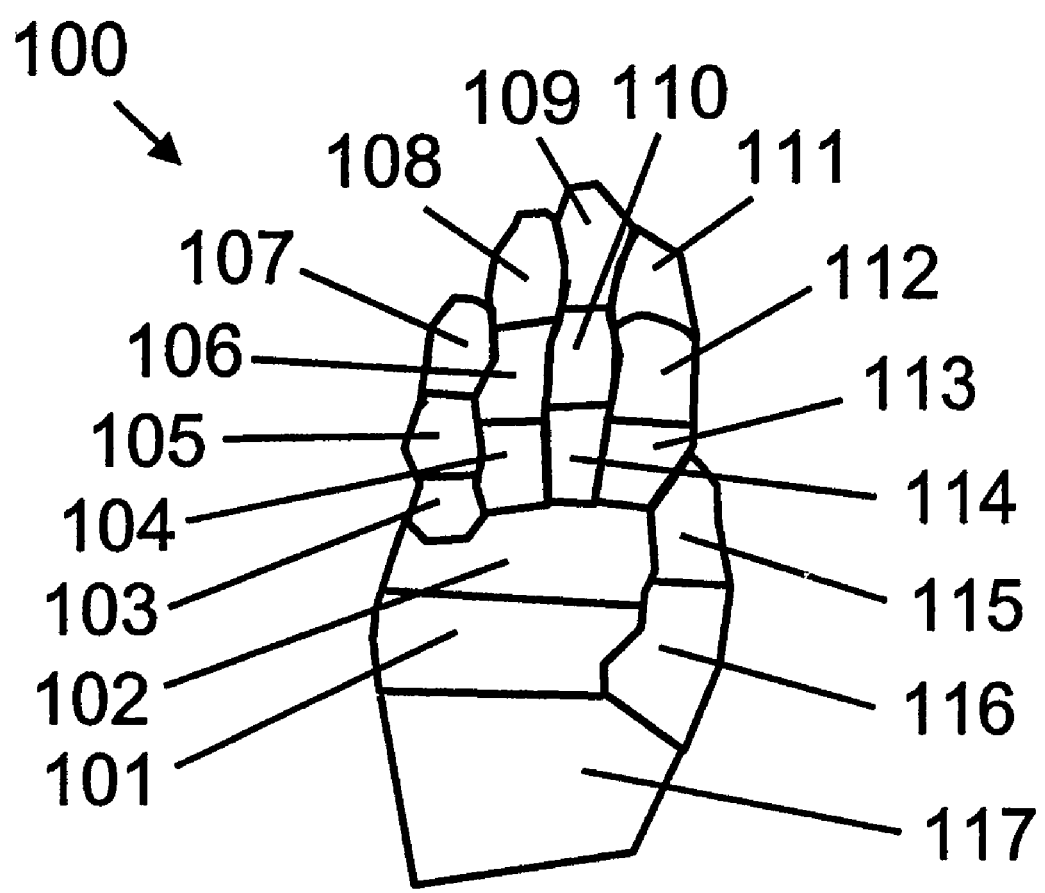
FIG. 3 depicts a front view of the tactile display device of FIGS. 1 and 2.

FIG. 3 depicts a front view of the tactile display device illustrated in FIGS. 1 and 2, also arranged in accordance with the present disclosure. As shown, tactile display device 100 may be divided into a plurality of zones 101-117. Zones may be utilized for grouping and/or bundling of wires and/or routing the signals (not shown), for example.

Figure 4:
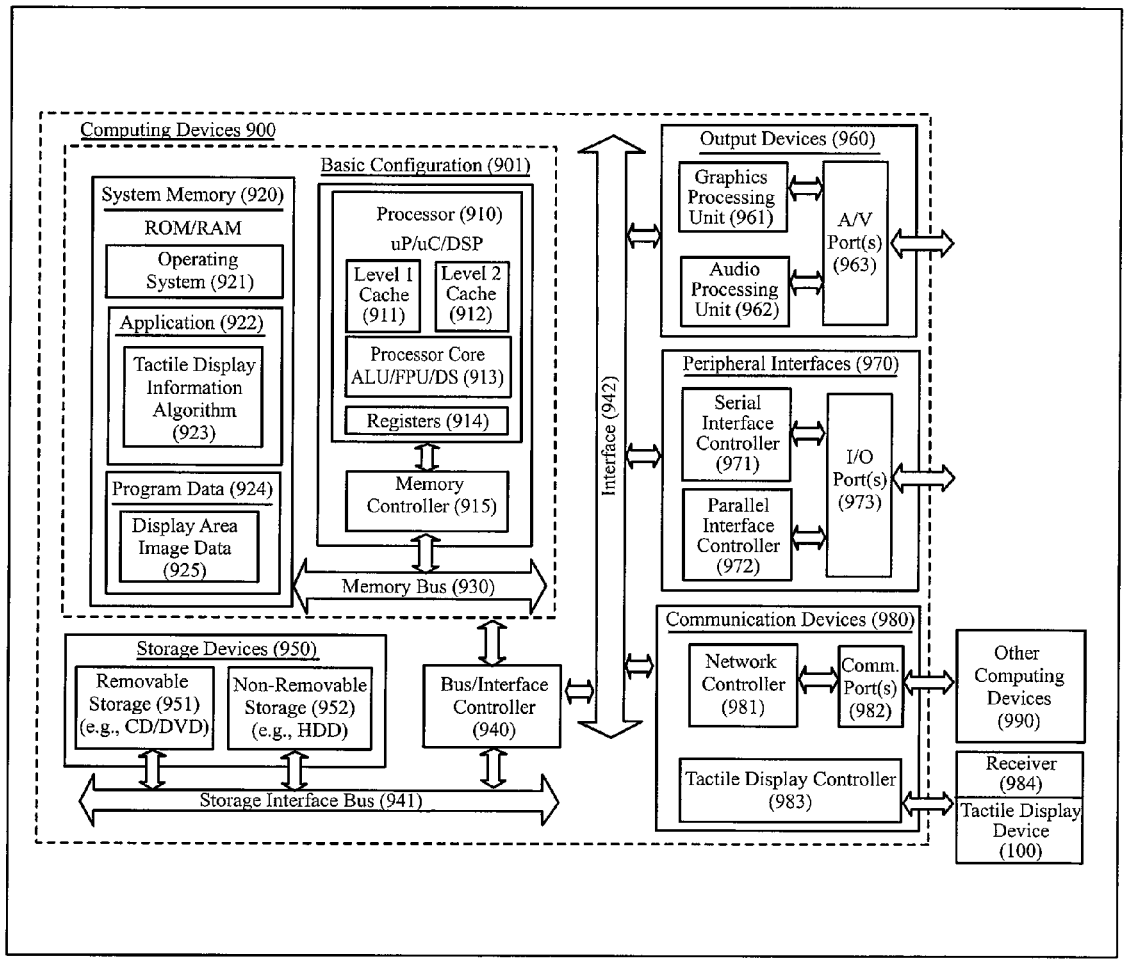
FIG. 4 depicts a block diagram of an example system configured for use with the tactile display device of FIGS. 1-3.

FIG. 4 depicts a block diagram of an example system configured for use with the tactile display device of FIGS. 1-3. As depicted in FIG. 4, a suitable computing device 900 may be configured for use with the tactile display 100. In a basic configuration 901, the computing device 900 may include one or more processors 910 and system memory 920. A memory bus 930 may be used for communicating between the processor 910 and the system memory 920.

Depending on the desired configuration, the processor 910 may be of any type including but not limited to a microprocessor (µP), a microcontroller (µC), a digital signal processor (DSP), an ARM968 processor, other processor with suitable functionality and capabilities, or any combination thereof. The processor 910 may include one or more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910. In some examples, processor and peripherals may be integrated into a single application specific integrated circuit (ASIC).

Depending on the desired configuration, the system memory 920 can be of any type including but not limited to volatile memory (such as RAM), non-volatile memory (such as ROM, flash memory, etc.) or any combination thereof. System memory 920 may include an operating system 921, one or more applications 922, and program data 924. Application 922 may include an algorithm 923 that is arranged to process information related to the tactile display. Program Data 924 may include, for example, image information 925, from which an area for display may be determined. In some examples, application 922 can be arranged to operate with program data 924 on an operating system 921 such that area for display may be determined. This described basic example configuration is illustrated in FIG. 2 by those components within dashed line 901.

The computing device 900 may have additional features or functionality, and additional interfaces to facilitate communications between the example basic configuration 901 and any devices and interfaces. For example, a bus/interface controller 940 may be used to facilitate communications between the example basic configuration 901 and one or more data storage devices 950 via a storage interface bus 941. The data storage devices 950 may be removable storage devices 951, non-removable storage devices 952, or a combination thereof. Examples of removable storage and non-removable storage devices include, e.g., magnetic disk devices such as flexible disk drives and hard-disk drives (HDD), optical disk drives such as compact disk (CD) drives or digital versatile disk (DVD) drives, solid state drives (SSD), and tape drives. Example computer storage media may include volatile and nonvolatile, removable and non-removable media implemented in any method or technology for storage of information, such as, e.g., computer readable instructions, data structures, program modules, or other data.

System memory 920, removable storage 951 and non-removable storage 952 are examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900.

The computing device 900 may also include an interface bus 942 for facilitating communication from various interface devices (e.g., output interfaces, peripheral interfaces, and communication interfaces) to the basic configuration 901 via the bus/interface controller 940. Example output devices 960 may include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973.

An example communication device 980 may include a network controller 981, which may be arranged to facilitate communications with one or more other computing devices 990 over a network communication via one or more communication ports 982. This communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media and/or computer-accessible medium as used herein may include, e.g., both storage media and communication media, for example.

The computing device 900 may also include a tactile display controller 983 for communicating with the tactile display device 100. In some examples, the display controller 983 may be configured for communicating with one or more additional tactile display devices, which may or may not be configured the same or similarly to tactile display device 100.

The computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 900 may also be implemented as a personal computer including both laptop computer and non-laptop computer configurations. The computing device 900 may also be implemented as an interactive system such as an information kiosk, television, or a gaming device.

Figure 5:
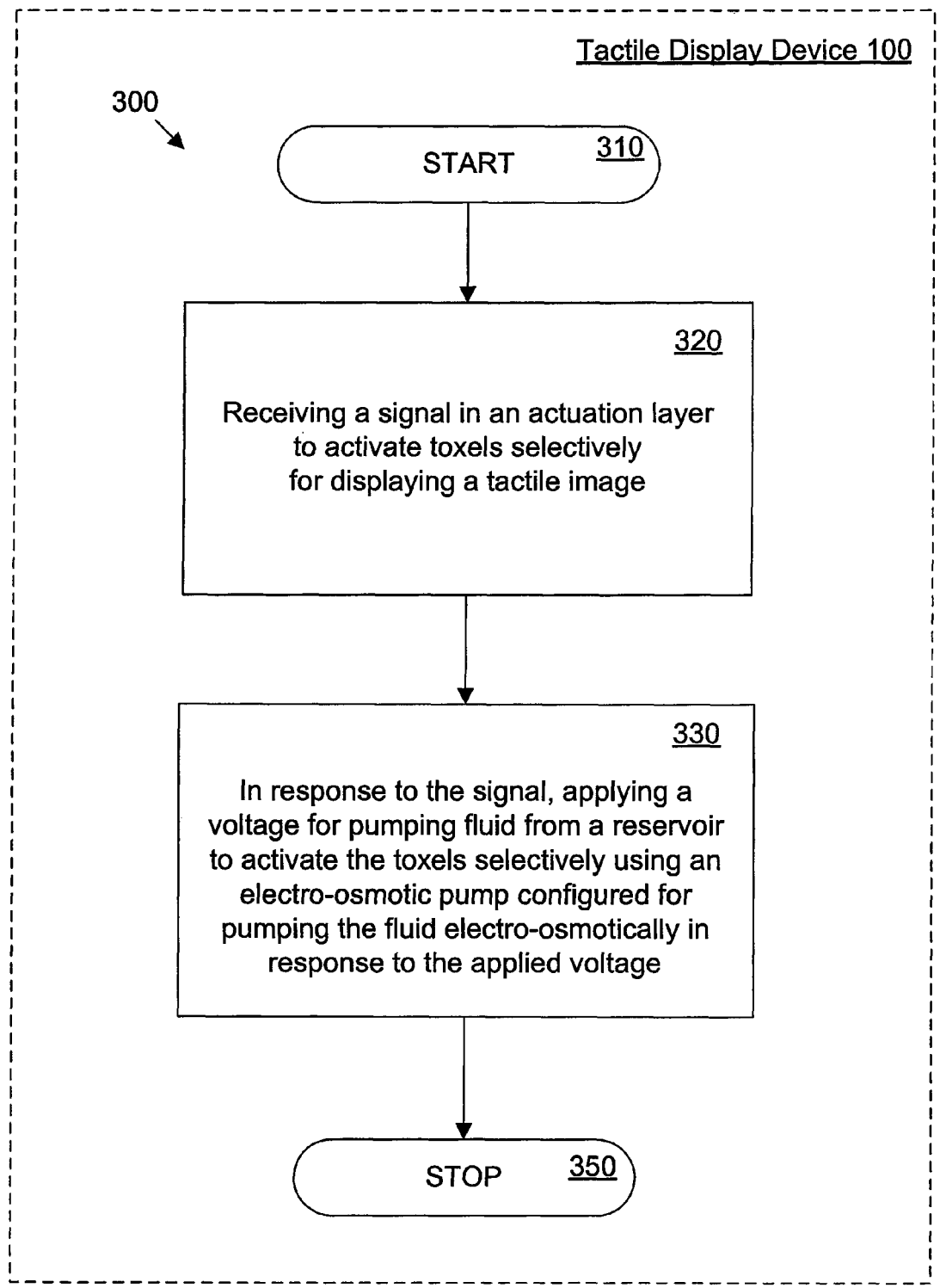
FIG. 5 depicts a flow diagram of an example procedure for using the tactile display device of FIGS. 1-3, all arranged in accordance with at least some implementations of the present disclosure.

FIG. 5 depicts a flow diagram of an example procedure 300 for using the tactile display device 100 of FIGS. 1-3, also arranged in accordance with the present disclosure. According to FIG. 5, procedure 300 may be implemented in the tactile display device 100 and may include one or more functional operations as depicted by blocks 310, 320, 330 and/or 350. The procedure 300 may be initiated at block 310. Continuing from block 310 to block 320, the procedure 300 may comprise receiving a signal, such as the signal 125, in an actuation layer to activate toxels, such as toxels 133, 134, 135, selectively for displaying a tactile image 320. Continuing from block 320 to block 330, the procedure 300, in response to the signal, may include applying a voltage for pumping fluid from a reservoir, such as the reservoir 122, to activate the toxels selectively using an electro-osmotic pump configured for pumping the fluid electro-osmotically in response to the applied voltage.

While some examples of a tactile display device may be in the form of a glove sized and configured to be worn by a human user, some examples may be in the form of any garment or article of clothing that may worn by a human, such as, e.g., a shirt, jacket, pants, leggings, socks, body suit, hat, and/or any type of footwear, sized and configured to be worn by a human user. Some examples may be of a different size and/or adjustable to accommodate variation in size and shape of users of a tactile display device.

In some examples, a combination of an electro-osmotic capable layer with a reservoir layer and a flexible bubble forming layer may utilize only modest voltages, for example from approximately about 1 volt to about 12 volts, and a single patterned electrode layer to form bubbles at certain pixel locations, resulting in some relatively inexpensive and scalable examples of tactile displays in accordance with the present disclosure. The touch pixels (toxels), which may be actuated, may have a spacing, arrangement and/or configuration determined by a single electrode layer, for example. According to some examples, toxels may be controlled by the amplitude of the signal provided, for example, so as, e.g., to expand the corresponding bubbles in a scaleable manner.

Furthermore, while some examples of a tactile display device in accordance with the present disclosure may use electro-osmotic bubble forming elements, other examples may use other forms of bubble forming elements and/or other mechanisms to communicate touch data to a user. For example, a combination of bubbles and extendible rods may be used such that when a signal is received, a bubble causes the extendible rod to extend and communicate the touch data to the user.

Furthermore, some examples of the tactile display device may be configured for use by people who do not have all five of their senses, whether born without or lost for whatever reason. Accordingly, some examples may be configured for use by people who are blind or have lost a significant portion of their vision. Such examples may comprise Braille or emit an audio signal, for example using a controller, that can be heard by the blind user to enable them to locate and utilize the tactile display device. Other examples may be configured for people who are deaf or who have lost a significant portion of their hearing. Such examples may be configured to include special visual markings and/or emit light to assist and/or enhance the experience of the user.

Figure 6:
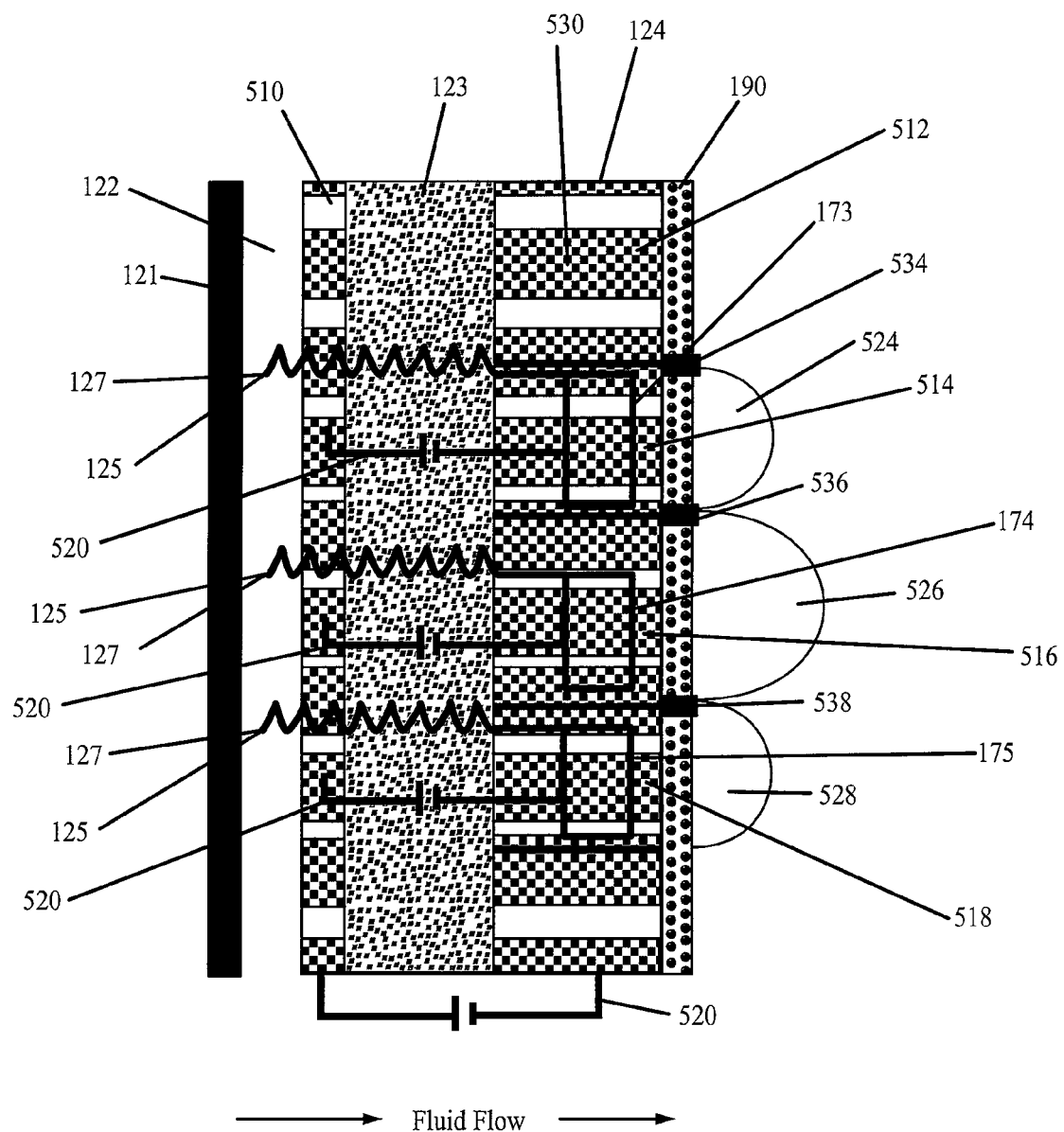
FIG. 6 depicts an enlarged view of the layers of an example of a tactile display.

Provided herein is an example of a tactile display device, as shown in FIG. 6 that may comprise a reservoir 122 that may be configured for containing a driving fluid (not shown), a plurality of toxel portions 512, 514, 516, 518 that may be sensitively drivable by the fluid for causing toxels to be displayed 524, 526, 528, and a pump member 123 that may be associated with the reservoir 122 and toxel portions 512, 514, 516, 518 for pumping the fluid from the reservoir 122 selectively to the toxel portions for displaying 524, 526, 528 a tactile image. Actuators 173, 174, 175 may receive signals from an external but associated digital source (not shown). The actuators 173, 174, 175 that receive a signal 125 through wires 127 used to carry the signal 125 may then apply a voltage 520 across the pump member 123, which may include a layer of positive electrodes 510 disposed on the outside of the pump member, and a layer of negative electrodes 124, which may be disposed within the toxel layer 124. The applied voltage 520 across the pump member 123 may move the drive fluid (not shown) from the reservoir layer 122 to the toxel layer 124 expanding the elastomeric layer 190 of select toxels 514, 516, 518, resulting in touch information being communicated to a user.

Electro-osmotic pumps may generate liquid flow through the application of an electrical potential across a fluid-filled structure. Electro-osmotic pumps take advantage of the double layer that typically forms at a solid-liquid interface. The pumps may have pore-like features within a few orders of magnitude of the size of the electric double layer; generally less than a micron. The pump member 123 may comprise an electro-osmotic pump that may be configured for pumping the fluid electro-osmotically in response to an applied voltage, such as a low-voltage DC power source 520. For example, and with reference to FIG. 6, a signal 125 may be sent from a computer or other digital media (not shown) to select actuators 173, 174, 175 in the toxel layer 124. The select actuators 173, 174, 175 may be chosen according to the environment in which the tactile display is being used. For instance, if a person is using a wearable glove tactile display and is petting an animal in a virtual world, a computer signal may be sent to select actuators correlating to positions on the fingers and palms on the wearable glove. In response to receiving the signal, the select actuators 173, 174, 175 may apply a voltage 520 that will pump the drive fluid from the reservoir 122 to the select toxels 514, 516, 518, resulting in the bubbles 524, 526, 528 being displayed, and communicating tactile touch information to the user. The pump member 123 may be configured to selectively pump the fluid to generally activate the toxels independently from each other, as described.

The toxel layer 124 may include the plurality of toxels 512, 514, 516, 518 as well as an elastomeric membrane 190 that may have a pattern of the toxels, and may be configured such that the toxels may be expandable generally independently of each other, as shown in FIG. 6 where only three of the toxels shown have expanded in response to the signals 125 provided to the corresponding actuators 173, 174, 175. The elastomeric membrane 190 may include stationary portions 534, 536, 538 disposed between the toxels 512, 514, 516, 518 and that are relatively immobilized with respect to the toxels. The toxels may be elastically deformable in response to the increased pressure of the fluid pumped into them.

The tactile display may further comprise an actuation layer that may be associated with the pump member for causing the pump member to selectively pump the fluid to selected toxels in response to a signal corresponding to a tactile image to be displayed. In FIG. 6, for example, the actuation layer is disposed within the toxel layer 124. The actuation layer may comprise a pattern of electrodes 530 that may be configured for receiving a signal 125 corresponding to the tactile image to be displayed and producing voltage differences 520 across the electro-osmotic layer 123 for pumping the fluid locally to actuate the selected toxels 514, 516, 518 and produce the image 524, 526, 528. The actuation layer may be integral with the elastomeric membrane 190, or the toxel layer 124. In some examples, the actuation layer may be attached to the electro-osmotic layer 123 on a side of the electro-osmotic layer nearer to the toxel layer.

The tactile display may further comprise a reservoir layer that may be disposed on a side of the electro-osmotic layer opposite from the toxel layer and defining the reservoir adjacent the electro-osmotic layer, wherein the actuation layer is disposed on the reservoir layer. A receiver may be included that may be configured to receive the signal wirelessly.

Also provided herein is an example of a method for driving a tactile display device that may comprise: receiving a signal in an actuation layer; and in response to the signal, applying a voltage for pumping fluid from a reservoir to activate toxels selectively using an electro-osmotic pump configured for pumping the fluid electro-osmotically in response to the applied voltage. The applying may be performed using a tactile display device comprising a reservoir configured for containing a driving fluid, a plurality of toxel portions sensitively drivable by the fluid for causing toxels to be displayed, and a pump member associated with the reservoir and toxel portions for pumping the fluid from the reservoir selectively to the toxel portions for displaying a tactile image. In some examples, the pump member may be configured for pumping the fluid to the reservoir. In some further examples, the pump member may be configured for bi-directional electro-osmotic flow.

Also provided herein is an example of an article of clothing for tactile display that may comprise a reservoir configured for containing a driving fluid, a plurality of toxel portions sensitively drivable by the fluid for causing toxels to be displayed, and a pump member associated with the reservoir and toxel portions for pumping the fluid from the reservoir selectively to the toxel portions for displaying a tactile image. The article may be configured and dimensioned to be worn by a person. In some examples, the article of clothing may further comprise an actuator associated with the pump member for causing the pump member to selectively pump the fluid to selected toxels in response to a signal corresponding to a tactile image to be displayed.

The foregoing describes various examples of tactile display, including some example devices, apparatus and methods. These examples are for illustration only and are not intended to be limiting.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those having ordinary skill in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having ordinary skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having ordinary skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having ordinary skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those having ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one having ordinary skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A tactile display device that uses a driving fluid to form a tactile image, the tactile display device comprising:
    a reservoir configured to contain the driving fluid;
    a plurality of toxel portions that are drivable by the fluid, each toxel being arranged to form a portion of the tactile image; and
    an electro-osmotic pump member associated with the reservoir and toxel portions, wherein the pump member is arranged to selectively electro-osmotically pump the fluid in response to an applied voltage from the reservoir to selected toxel portions to display the tactile image.

2. The device of claim 1, wherein the pump member is configured to selectively pump the fluid to generally activate toxels independently from each other.

3. The device of claim 1, wherein the electro-osmotic pump member comprises an electro-osmotic layer configured to electro-osmotically pump the fluid locally to selected ones of the toxels.

4. The device of claim 3, further comprising a toxel layer that includes the plurality of toxels.

5. The device of claim 4, wherein the toxel layer includes an elastomeric membrane having a pattern of the toxels, and configured such that the toxels are expandable generally independently of each other.

6. The device of claim 5, wherein the elastomeric membrane includes stationary portions disposed between the toxels, wherein the stationary portions are relatively immobilized with respect to the toxels.

7. The device of claim 5, wherein the toxels are elastically deformable in response to increased pressure of the fluid pumped into association therewith.

8. The device of claim 7, further comprising an actuation layer associated with the electro-osmotic layer, wherein the actuation layer is arranged to selectively activate the electro-osmotic layer to selectively pump fluid to selected toxels in response to a signal corresponding to the tactile image to be displayed.

9. The device of claim 8, wherein the actuation layer comprises a pattern of electrodes configured to receive a signal corresponding to a tactile image to be displayed and produce voltage differences across the electro-osmotic layer to pump the fluid locally to actuate the selected toxels and produce the tactile image.

10. The device of claim 8, wherein the actuation layer is integral with the elastomeric membrane.

11. The device of claim 8, wherein the actuation layer is attached to the electro-osmotic layer on a side of the electro-osmotic layer nearer to the toxel layer.

12. The device of claim 8, further comprising a reservoir layer disposed on a side of the electro-osmotic layer opposite from the toxel layer, wherein the reservoir layer is defines the reservoir adjacent the electro-osmotic layer, wherein the actuation layer is disposed on the reservoir layer.

13. The device of claim 8, further comprising a receiver configured to receive the signal wirelessly.

14. A method for driving a tactile display device that uses a driving fluid to form a tactile image, the method comprising:
    receiving a signal in an actuation layer; and
    in response to the signal, applying a voltage to selectively pump fluid from a reservoir to selectively activate toxels using an electro-osmotic pump configured to pump the fluid electro-osmotically in response to the applied voltage.

15. The method of claim 14, wherein applying the voltage is performed using a tactile display device, comprising:
    the reservoir configured for containing a driving fluid;
    a plurality of toxel portions sensitively drivable by the fluid for causing toxels to be displayed; and
    a pump member associated with the reservoir and toxel portions for pumping the fluid from the reservoir selectively to the toxel portions for displaying a tactile image.

16. The method of claim 14, further comprising pumping the fluid to the reservoir with the pump member, wherein the pump member is configured for bi-directional electro-osmotic flow.

17. An article of clothing configured to displays a tactile image, comprising:
    a reservoir configured to contain a driving fluid;
    a plurality of toxel portions sensitively drivable by the fluid to cause toxels to be displayed;
    an electro-osmotic pump member associated with the reservoir and toxel portions to electro-osmotically pump the fluid in response to an applied voltage from the reservoir selectively to the toxel portions to display the tactile image.

18. The article of clothing of claim 17, wherein the article is configured and dimensioned to be worn by a person.

19. The article of clothing of claim 17, further comprising an actuator associated with the electro-osmotic pump member to cause the electro-osmotic pump member to selectively pump the fluid to selected toxels in response to a signal corresponding to the tactile image to, be displayed.

* * * * *